United States Patent [19]
Hart

[11] Patent Number: 5,860,659
[45] Date of Patent: *Jan. 19, 1999

[54] CARRIER FOR HOLDING AND TRANSPORTING CONTAINERS

[76] Inventor: Michael Edward Hart, 15427 Village Cir., Biloxi, Miss. 39532

[ * ] Notice: The terminal 27 months of this patent has been disclaimed.

[21] Appl. No.: 370,647

[22] Filed: Jan. 10, 1995

[51] Int. Cl.⁶ .................................................. B62B 3/10
[52] U.S. Cl. ..................... 280/79.5; 280/400; 280/410; 280/47.131
[58] Field of Search ..................... 280/47.131, 47.34, 280/47.35, 47.18, 79.3, 79.5, 79.6, 408, 410, 477, 497, 456.1, 79.2, 498, 461.1; 188/19; D34/24, 21, 23, 39, 17, 5

[56] References Cited

U.S. PATENT DOCUMENTS

| | | | |
|---|---|---|---|
| D. 219,870 | 2/1971 | Stover ........................................ | D12/2 |
| 914,722 | 3/1909 | Holland et al. ........................... | 280/400 |
| 933,794 | 6/1909 | Sprung ..................................... | 280/400 |
| 2,745,676 | 5/1956 | Scott . | |
| 2,881,007 | 4/1959 | Karwatt et al. . | |
| 2,904,345 | 9/1959 | Bradley . | |
| 3,031,207 | 4/1962 | Bard ....................................... | 280/460.1 |
| 3,188,109 | 6/1965 | Broadrick . | |
| 3,377,085 | 4/1968 | Fralick ............................... | 280/47.131 |
| 3,727,945 | 4/1973 | Parker ..................................... | 280/486 |
| 3,912,300 | 10/1975 | Bryan ...................................... | 280/400 |
| 4,313,612 | 2/1982 | Rubens ................................... | 280/79.5 |
| 4,351,541 | 9/1982 | Propst et al. ........................... | 280/408 |
| 4,358,238 | 11/1982 | Ely ......................................... | 280/408 |
| 5,088,751 | 2/1992 | Zint ........................................ | 280/79.5 |
| 5,110,147 | 5/1992 | Gershman ............................. | 280/79.5 |
| 5,219,175 | 6/1993 | Woelfel .................................. | 280/79.6 |
| 5,292,140 | 3/1994 | Laing ..................................... | 280/79.5 |

FOREIGN PATENT DOCUMENTS

| | | | |
|---|---|---|---|
| 2367456 | 5/1978 | France .................................... | 280/79.2 |

*Primary Examiner*—Anne Marie Boehler
*Attorney, Agent, or Firm*—Law Offices Of Royal W. Craig

[57] ABSTRACT

A carrier or cart for holding and transporting two or more containers, in particular, garbage/trash cans or bins. The cart is designed for easy maneuverability to facilitate storage and simultaneous transport of multiple containers.

9 Claims, 4 Drawing Sheets

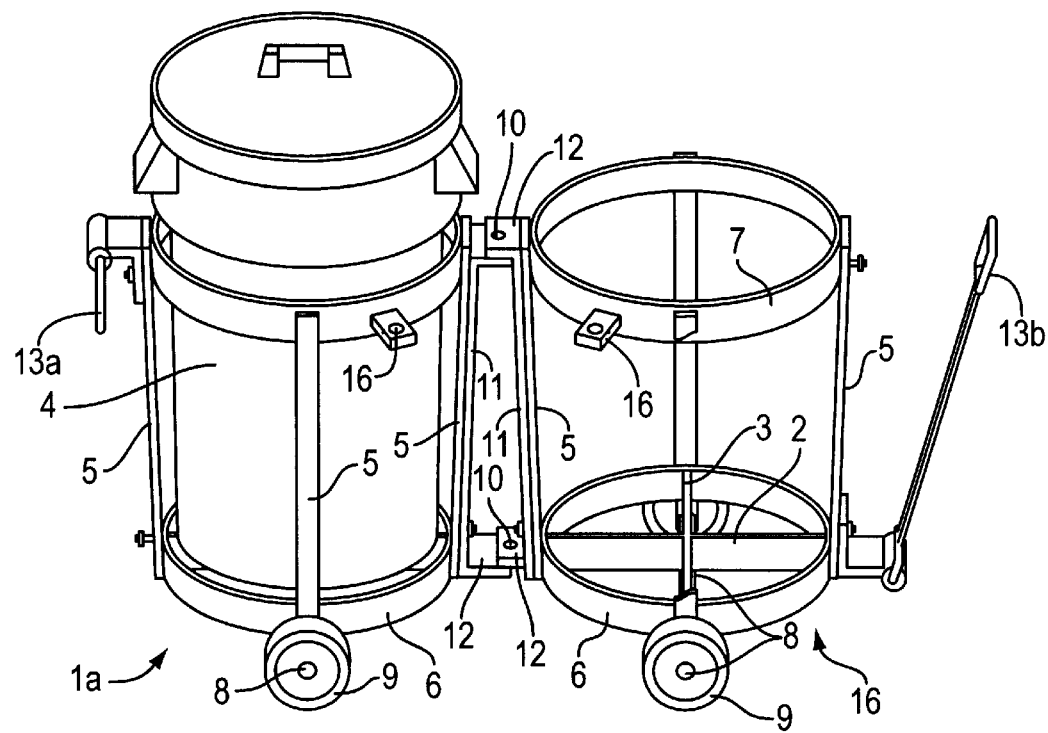
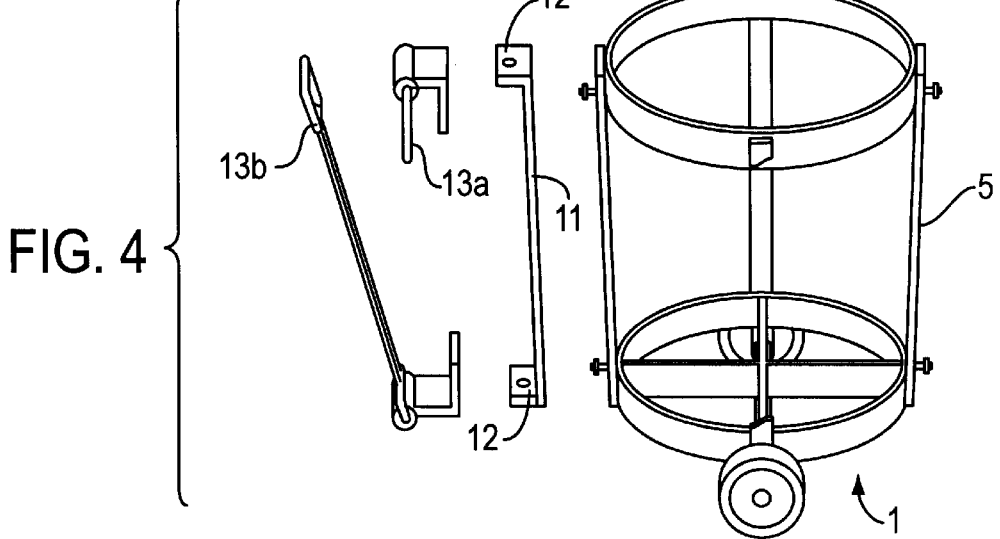

CARRIER FOR HOLDING AND TRANSPORTING CONTAINERS

BACKGROUND OF THE INVENTION

1. Field of the Invention

The invention is directed to a carrier or cart for holding and transporting containers, in particular, garbage cans or bins. The cart is designed for easy maneuverability to facilitate storage and transport of multiple containers.

2. Description of Related Art

The conventional trash or garbage container is normally placed in the garage of one's home or near the back door of residences, apartments, restaurants, stores and manufacturing facilities. With the exception of commercial and industrial usage where trucks equipped with front end lifts upend large trash bins into the trucks, most trash containers have to be hand carried. In order to minimize the time and cost of refuse collection, and to reduce work related injuries, most urban areas require that trash be carried to the curb on garbage collection days rather than picked up at the back door/alley by sanitation workers. Thus, householders must carry their trash bags and barrels to the curbside outside their homes or the trash will not be collected. For many, curbside pickup is merely an inconvenience; for others, it is a difficult task.

Moving heavy and often unwieldy trash cans can be a strenuous activity, not only to those who are employed to do so, but also to homeowners. Carrying a heavy trash container to the alley or front curb for trash pickup is awkward for an adult and even more trying for a youngster. Moreover, moving heavily loaded garbage storage cans ordinarily requires great effort and can often injure the workman or person attempting to move the same. In addition, many individuals suffer from impairments of the back or spine and other physical problems which limits activity. For those with chronic back pain, as well as for elderly people, transporting trash cans to the curb on collection day is a physically difficult and demanding task.

U.S. Pat. No. 2,745,676 discloses a carrier for transporting trash burners. The carrier comprises an open framework adapted to receive a trash burner. The framework is mounted upon wheels to facilitate movement from place to place. U.S. Pat. No. 2,881,007 discloses a rolling garbage can comprising a container mounted upon wheels. U.S. Pat. No. 2,904,345 is directed to attachment means for lifting and moving a container, in particular a garbage can. U.S. Pat. No. 3,188,109 discloses a combined cart and stand for containers such as garbage cans. Each of these patents disclose wheelbarrow type devices for holding and transporting a container whereby the container can be tilted and wheeled from place to place. Such trash can holders require the user first to lift and then to push or pull the holder and contents thereof to its destination. Merely lifting a cart holding a heavily loaded container can tax the strength of the user. Moving and steering such carts is also difficult and awkward.

Americans produce 160 million tons of solid waste every year, more than three pounds per person each day—the highest per capita rate among industrialized nations. A family of four typically fills two, three or more garbage cans per week. Since most municipalities collect trash only once a week, multiple trips between the house and curbside on collection day is usually required. The need to make numerous trips further complicates this strenuous and unpleasant chore.

U.S. Pat. No. 3,377,085 is directed to a trash cart for hauling two trash containers. The cart is formed of two cart members each of which are movably supported by a single laterally extending axle means. The cart members are longitudinally connected as a single unit by pivot means extending longitudinally therebetween.

U.S. Pat. No. 4,313,612 discloses a convertible trash container carrier having four corner located retractable wheels. Retracting the wheel assemblage converts a wheeled carrier for transportation to a ground supported unit which is more or less a stationary holder of a trash container. Coupling means are described for attaching two trash container carriers together.

U.S. Pat. No. 5,110,147 is directed to a transporter for moving trash cans. A platform is provided having upwardly extending means which are radially adjustable for accommodating containers of different sizes. A plurality of wheels are provided underneath the platform, with at least one wheel being a swiveled forward wheel. Coupling holes are provided in the front and rear of the platform. A connector means can be hooked into the rear coupling hole of one platform and into the forward coupling hole of a trailing platform to form a train for moving several trash cans at once.

While many carriers, carts, dollies and other devices have been designed to simplify and reduce the difficulties of trash removal, a way to make trash removal faster, easier, safer and move convenient continues to exit in the art.

SUMMARY OF THE INVENTION

The invention is directed to a carrier for holding and transporting containers such as garbage cans. The carrier of the invention is light weight yet extremely sturdy, and is easy to maneuver. Two or more containers can be simultaneously transported with ease. The carrier is inexpensive, easy to assemble, and can be readily customized to accommodate a variety of end uses.

It is an object of the invention to provide a carrier in which trash cans and like containers may be placed. Another object of the invention is to provide a carrier which will facilitate and minimize the storage of garbage cans and the like. Yet another object of the invention is to provide a carrier for two or more containers which can be temporarily braced or locked in order to prevent unwanted movement or the accidental rolling away thereof. Still another object of the invention is to provide a device which can be shipped in "knock-down" form and easily assembled by the end user.

In one embodiment of the invention, a carrier for holding and transporting containers is provided. The carrier comprises at least a first and a second carrier unit pivotally attached through the longitudinal axis thereof, each carrier unit having at least two vertical support frame members, at least two ring frame members, and a horizontal support frame member, each carrier unit being movably supported by a single laterally extending axle means containing laterally spaces wheels. In a preferred embodiment, the carrier units contain at least one handle means and a mean for locking the carrier in a pivoted position.

Using the carrier of the invention, containers may be moved from the place where the containers are normally located to be filled (e.g., garage, car port, alley, back yard) to another place (e.g., curbside) where the containers are normally located to be emptied.

BRIEF DESCRIPTION OF THE DRAWINGS

FIG. 1 is a side elevational view of a carrier of the invention showing a trash receptacle positioned in one of the carrier units.

FIG. 4 is an exploded view showing various components of a carrier of the invention.

DETAILED DESCRIPTION OF THE INVENTION

Figure 2:
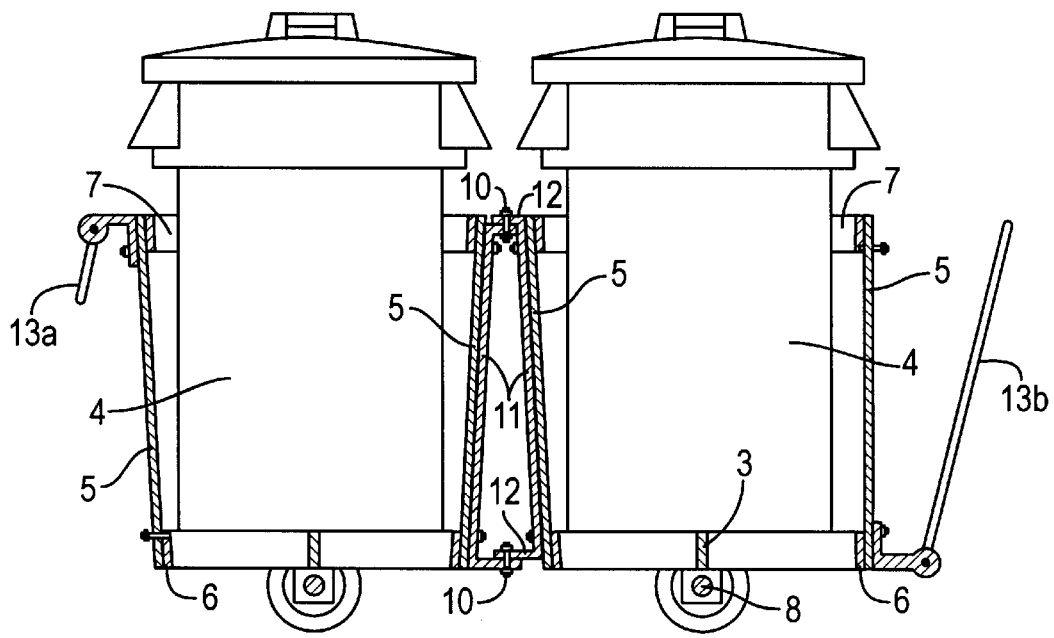
FIGS. 2 and 3 are longitudinal sectional views showing carriers of the invention with trash receptacles positioned in each carrier unit thereof.

The invention relates to a trash carrier or cart for hauling two or more substantially identical trash containers. More particularly, the invention relates to a trash cart formed by two or more pivotally connected cart or carrier unit members. Each unit member of the carrier of the invention has a single laterally extending axle means thereon movably supporting the carrier unit and permitting lateral pivoting between each unit member.

The nature and characteristic features of the invention will be more readily understood from the following description, taken in connection with the accompanying drawing Figures. In describing the invention, the terms carrier, cart, caddie, dolly, device, apparatus and the like are used herein as referring to the carrier of the invention. The terms cans, containers, barrels, receptacles, bins, drums and the like are used herein to refer to anything which can be accommodated (i.e., held and transported) by the carrier of the invention.

Referring to the drawings, the carrier of the invention comprises at least two, preferably substantially identical carrier member units 1. Each carrier unit comprises a principally cylindrical shaped open frame work mounted upon wheels to facilitate movement from place to place. While the frame work is of cylindrically shaped, it is to be understood that square and rectangular containers, in additional to conventional round containers, are contemplated for insertion therein. The containers are removably disposed in the carrier units.

Each cylindrically shaped carrier unit member 1 comprises a horizontal base support frame member. Preferably, the horizontal base support frame member is formed of single longitudinal 2 and laterally 3 extending cross members. Preferably, the longitudinally extending cross member 2 and the laterally extending cross member 3 each crosses centrally of the other so that longitudinal cross member 2 is laterally centered relative to the lateral cross member 3 and the lateral cross member 3 is longitudinally centered relative to longitudinal cross member 2. Longitudinal cross member 2 may be formed in two halves secured abutting lateral cross member 3. Together, cross members 2 and 3 present a smooth horizontal supporting surface for receiving a trash drum 4.

Each cylindrically shaped carrier unit member also contains at least two vertical support frame members 5, and at least two supporting ring frame members, a lower ring member 6 proximal to the horizontal base support frame member and an upper ring member 7 distal thereto. Preferably, the horizontal base support member is encompassed by lower ring member 6. Supporting ring frame members 6 and 7 are attached to vertical support frame members 5. The vertical support frame member 5 and the supporting ring frame members 6 and 7 together provide vertical support to hold containers in an upright position, thus preventing full containers from falling off and/or empty or lightweight containers from blowing away.

Each carrier unit has a single laterally extending axle means 8 which movably supports the carrier unit 1. Each axle 8 rotatably supports laterally spaced wheels 9. The wheels 9 are freely rotatable on the axle 8. Preferably, and in order to provide maximum maneuverability, the axle is positioned under the lateral cross member 3 such that the entire carrier unit rides above the horizontal plane of the axle. Alternatively, the axle means may extend through the laterally extending support member 3. Any conventional method of mounting the axle to the base of the carrier may be used in practicing the invention.

Carrier units are longitudinally connected by pivot means extending longitudinally between each unit. In a particularly preferred embodiment, a first carrier unit is pivotally connected to a second carrier unit at two locations therebetween. This design prevents "jack-knifing" of the carrier, such as may occur if the containers carry loads of unequal weight. The vertical support frame members 5 contain pivot means 10 adapted to pivotally attach carrier unit members to one another. Alternatively, pivot means may be provided on ring support members 6 and 7.

Figure 3:
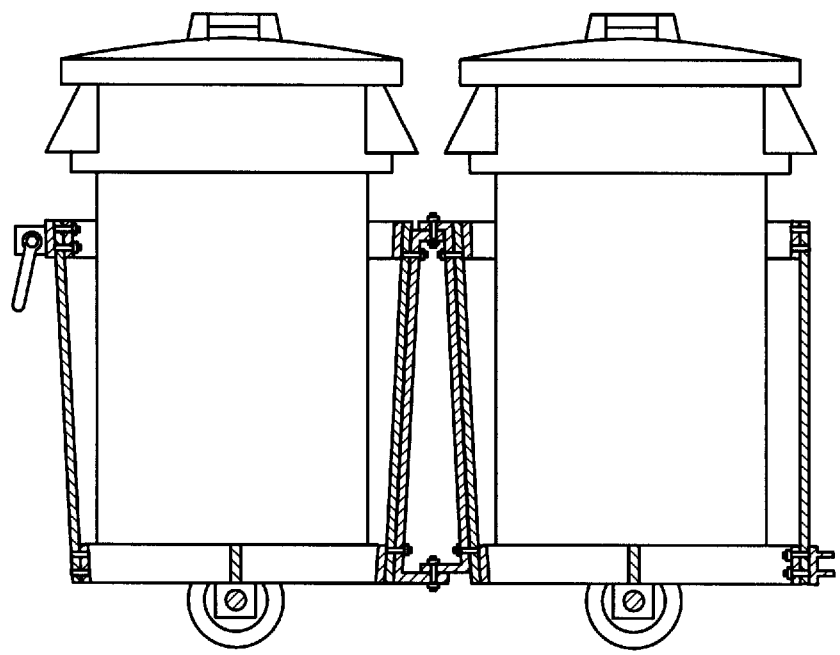

A preferred embodiment of the carrier of the invention comprises a front or first carrier unit 1a and at least a second or rear carrier unit 1b. As shown in FIGS. 1–3, the front and rear carrier units are pivotally attached to one another through the top and bottom of a connecting or linking bar 11. The linking bar 11 may contain radially extending upper and lower flange means 12 for this purpose. While FIGS. 1–3 illustrate the use of a separate connecting bar 11 secured to vertical support frame members 5, it will be understood that the vertical support frame member 5 may be formed so as to function directly as the linking means.

In use, a container is inserted through ring members 6 and 7 and lowered until the base of the container is resting on the horizontal support frame members 2 and 3. While the horizontal support frame member shown in the drawing Figures comprise longitudinally and laterally extending cross members, various modifications would be readily apparent and are encompassed by the claimed invention. For example, the horizontal support frame member may be a circular platform which supports in its entirety the base of the container to be inserted therein.

Handle means 13a–c for steering and propelling the cart is also provided. Such handle means is particularly useful for turning sharp corners, rolling up and down inclines, and for storage in a minimum amount of space. While various types of handles are illustrated herein, it is to be understood that other handle means may be used are encompassed by the claimed invention. Handle means can be mounted on the vertical support frame member and/or ring frame member. In a preferred embodiment, at least the lead or first unit is adapted to receive a handle. The handle is located to enable easy manual maneuverability (e.g., pull by hand). Attachment means 14 to allow attachment to a manual- or motor-driven vehicle as shown in FIG. 3 is also provided. Handle means such as 13b shown in FIG. 1 may also be adapted for use with a motor driven vehicle. Location of the handle and the design thereof will be determined by, for example, whether the cart will be moved be hand or attached to a motor vehicle. While the carriers of FIGS. 1, 2, 5 and 6 are shown with a handle member on both ends thereof, a single handle member preferably located on the lead or first carrier unit may be used. Location of a handle means at both ends of the carrier, however, facilitates movement.

Figure 5:
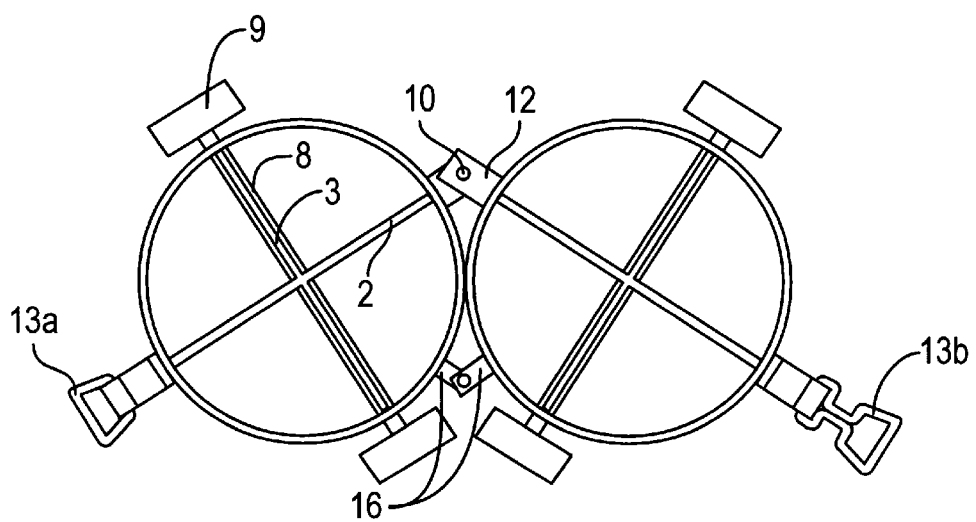
FIG. 5 is a top view of a carrier of the invention shown in a locked or braced position.
Figure 6:
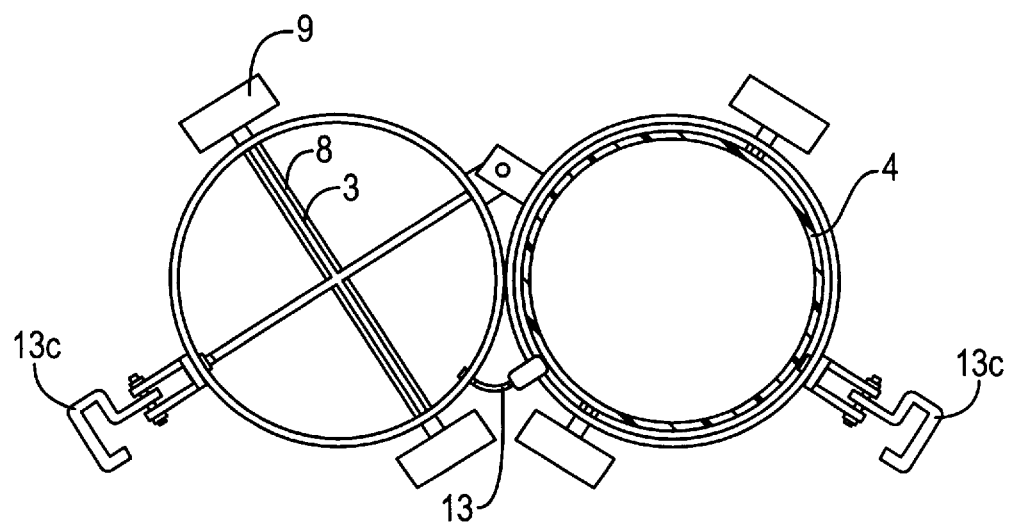
FIG. 6 is a top view of a carrier of the invention shown in a locked or braced position with a trash receptacle in one of the carrier units.
Figure 7:
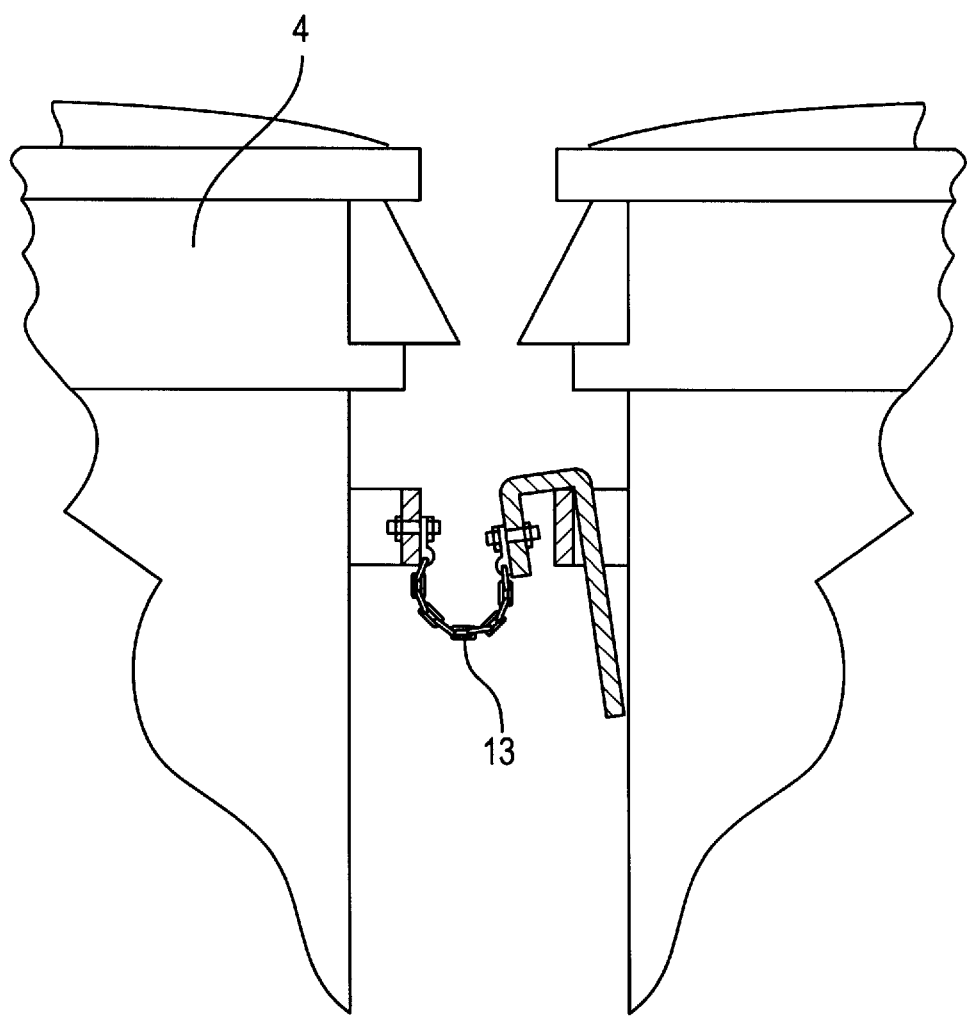
FIG. 7 shows a partial longitudinal perspective of the locked carrier shown in FIG. 6 holding trash receptacles in each of the carrier units.

In order to prevent unwanted forward/backward movement, the units are pivoted toward one another. The units then are secured together with, for example, a hinged latch 15, as shown in FIGS. 6 and 7. Alternatively, engageable flanges 16 may be provided on the supporting ring members 6 and 7, as shown in FIGS. 1 and 5.

The carrier of the invention may be manufactured of plastic or metal. Preferably the cart is manufactured of light weight aluminum. While light weight aluminum is contemplated for domestic applications (e.g., containers for household trash/gardening), heavier metals and/or alloys thereof may be used for industrial purposes (e.g., transporting heavy drums of chemicals). The carrier of the invention can be easily manufactured using conventional technology such as metal extrusion and readily available materials and manufacturing processes well known in the art. The carrier may desirably be cast in a variety of colors to render it more attractive and aesthetically pleasing.

The several parts of the carrier of the invention may be secured to each other by any desired fastening means such as spot welding or rivets. In a preferred embodiment of the carrier of the invention, nuts and bolts are used to secure component parts together as a single unit. The device may then be shipped in "knock-down" form and the parts assembled by the user. Various components of the carrier of the invention are shown in FIG. 4. The "knock-down" embodiment of the invention is particularly of advantageous in that individual parts may be purchased for replacement and/or to customize the carrier as needed by the user. Depending on the intended use of the carrier, additional carrier units may be added or removed.

The claimed invention is used to store containers such as garbage cans as they are being filled so that they can be easily transported to the street on refuse collection day. The carrier of the invention acts as a storage unit for a plurality of receptacles wherein trash and debris can be deposited. Use of the invention avoids numerous trips back and forth to the house thus saving time and conserving energy. Moreover, use of the invention prevents strained muscles.

Use of the carrier of the invention is not limited to the holding and transport of garbage/trash receptacles. The carrier of the invention can advantageously be used as a garden caddie. Rakes, shovels, and the like can be stored in one carrier unit while the other carrier unit is used to deposit leaves, weeds, garden clippings, rocks, dog excrement, etc. Connection of a third carrier unit enables manure, fertilizer, mulch, and the like to be readily accessible.

A particularly important aspect of the invention is that the carrier can be easily and securely immobilized so as to "park" the carrier in a way to prevent the rolling thereof. In areas where trash is collected during the very early morning hours, many residents take their trash to the street before retiring for the evening. When left outdoors, trash is vulnerable to marauding dogs, cats, raccoons, rodents and the like. Scavenging through garbage is common in neighborhoods where pets are left unrestrained and allowed to wander at night. As a result, residents frequently awaken to find garbage and other debris spread throughout the yard, street and neighborhood which must be cleaned up. Moreover, seemingly moderate wind often cause containers to topple over. To prevent unwanted forward/backward movement, the units are pivoted toward one another. The units then are secured together by a braking or locking means.

While the invention has been described in detail, it will be understood that it is capable of further modifications and this application is intended to cover any variations, uses, or adaptations of the invention following in general, the principles of the invention and including such departures from the present disclosure as come with known or customary practice in the art to which the invention pertains, and as may be applied to the essential features hereinbefore set forth. Various changes in the details, materials and arrangements of parts which have been herein described and illustrated in order to explain the nature of the invention, may be made by those skilled in the art within the principle and scope of the invention as expressed in the appended claims.

We claim:

1. A carrier for holding and transporting containers, said carrier comprising:

a first mobile container carrier assembly and a second mobile container carrier assembly;

each of said first and second mobile container carrier assemblies comprising a base and a cooperating bracket assembly attached to each said base having a top flange and a vertically displaced bottom flange;

a separate pivot means located on each of the top and bottom flanges of each of said cooperating bracket assemblies, said separate pivot means on each of the top and bottom flanges aligned along a common vertical axis for allowing each of said first and second mobile container carrier assemblies to pivot about said common vertical axis with respect to one another; and means for locking said first mobile container carrier assembly at a pivoted orientation to said second mobile container carrier assembly to prevent movement of the entire carrier;

whereby said separate pivoting means on each of the top and bottom flanges of each of said cooperating bracket assemblies maintain each of said first and second mobile container carrier assemblies on a common longitudinal plane to maintain proper balance of the carrier, and likewise allow for smooth pivoting of each of said first and second mobile container carrier assemblies about said common vertical axis to prevent jackknifing during pivoted movement.

2. The carrier for holding and transporting containers of claim 1, said locking means further comprising:

a horizontally disposed flange attached to each of said first and second mobile container carrier assemblies, each of said horizontally disposed flanges having means thereon for interlocking said flanges;

whereby said first mobile container carrier assembly may be placed at a pivoted orientation to said second mobile container carrier assembly to bring said interlocking means into vertical alignment to interlock said flanges, thereby locking said first mobile container carrier assembly at a pivoted orientation to said second mobile container carrier assembly to prevent movement of the entire carrier.

3. The carrier for holding and transporting containers of claim 1 said locking means further comprising:

a bracket attached to each of said first and second mobile container carrier assemblies having an opening therethrough; and a latch member removably attached to one of said brackets and configured for insertion into the opening of the other of said brackets;

whereby said first mobile container carrier assembly may be placed at a pivoted orientation to said second mobile container carrier assembly to bring said brackets into horizontal proximity to allow said latch member attached to one of said brackets to be inserted into the opening of the other of said brackets, thereby locking said first mobile container carrier assembly at a pivoted orientation to said second mobile container carrier assembly to prevent movement of the entire carrier.

4. The carrier for holding and transporting containers of claim 1, further comprising:

connector means on each of said first and second mobile container carrier assemblies for selectively receiving a removable handle and an additional mobile container carrier assembly.

5. The carrier for holding and transporting containers of claim 4, further comprising:

at least one removable handle attached to at least one of said connector means on each of said first and second mobile container carrier assemblies.

6. The carrier for holding and transporting containers of claim 1, further comprising:

a horizontally disposed axle on an underside of said base of each of said first and second mobile container carrier assemblies, each of said horizontally disposed axles situated at a centroid position of the underside of said base of each of said first and second mobile container carrier assemblies; and a plurality of laterally spaced wheels rotatably mounted on each of said horizontally disposed axles for movably supporting each of said first and second mobile container carrier assemblies, whereby placement of said wheels and axles along a centroid position of the underside of said base of each of said first and second mobile container carrier assemblies maintains a balance between said first and second mobile container carrier assemblies while limiting the turning radius of the carrier to allow the first and second mobile container carrier assemblies to freely pivot with respect to one another without binding.

7. The carrier for holding and transporting containers of claim 1, each of said first and second mobile container carrier assemblies further comprising:

a plurality of vertical container support members extending upward from each of said bases of said first and second mobile container carrier assemblies; and at least one ring container support member circumscribing said plurality of vertical frame support members.

8. The carrier for holding and transporting containers of claim 7, wherein said at least one ring container support member on each of said first and second mobile container carrier assemblies support, said locking means which further comprises:

a horizontally disposed flange having means thereon for interlocking said horizontally disposed flanges of each mobile container carrier assembly;

whereby said first mobile container carrier assembly may be placed at a pivoted orientation to said second mobile container carrier assembly to bring said interlocking means of each horizontally disposed flange into vertical alignment to interlock said horizontally disposed flanges, thereby locking said first mobile container carrier assembly at a pivoted orientation to said second mobile container carrier assembly to prevent movement of the entire carrier.

9. The carrier for holding and transporting containers of claim 7, wherein said at least one ring container support member on each of said first and second mobile container carrier assemblies support said locking means which further comprises:

a bracket having an opening therethrough; and a latch member removably attached to one of said brackets and configured for insertion into the opening of the other of said brackets;

whereby said first mobile container carrier assembly may be placed at a pivoted orientation to said second mobile container carrier assembly to bring said brackets into horizontal proximity to allow said latch member attached to one of said brackets to be inserted into the opening of the other of said brackets, thereby locking said first mobile container carrier assembly at a pivoted orientation to said second mobile container carrier assembly to prevent movement of the entire carrier.

* * * * *